United States Patent
Venkatesan et al.

(10) Patent No.: US 11,863,470 B2
(45) Date of Patent: Jan. 2, 2024

(54) SYSTEMS AND METHODS FOR DELIVERY USING A MESSAGE QUEUE

(71) Applicant: Musarubra US LLC, Plano, TX (US)

(72) Inventors: Senthil K. Venkatesan, Bangalore (IN); Arthur S. Zeigler, Hillsboro, OR (US); Sudeep Das, Hillsboro, OR (US); Anders Swanson, Hillsboro, OR (US)

(73) Assignee: Musarubra US LLC, Plano, TX (US)

( * ) Notice: Subject to any disclaimer, the term of this patent is extended or adjusted under 35 U.S.C. 154(b) by 0 days.

(21) Appl. No.: 17/523,849

(22) Filed: Nov. 10, 2021

(65) Prior Publication Data

US 2022/0150187 A1 May 12, 2022

(30) Foreign Application Priority Data

Nov. 11, 2020 (IN) .............................. 202041049317

(51) Int. Cl.
*H04L 12/861* (2013.01)
*H04L 29/08* (2006.01)
*H04L 49/9057* (2022.01)
*H04L 67/55* (2022.01)

(52) U.S. Cl.
CPC .......... *H04L 49/9057* (2013.01); *H04L 67/55* (2022.05)

(58) Field of Classification Search
CPC ............................ H04L 49/9057; H04L 67/55
See application file for complete search history.

(56) References Cited

U.S. PATENT DOCUMENTS

| 10,091,215 B1 * | 10/2018 | Word ....................... H04L 63/10 |
| 2020/0145345 A1 * | 5/2020 | Finkelstein ............. H04L 47/58 |
| 2022/0021579 A1 * | 1/2022 | Cao .......................... H04L 43/08 |

* cited by examiner

*Primary Examiner* — Luat Phung
(74) *Attorney, Agent, or Firm* — HANLEY, FLIGHT & ZIMMERMAN, LLC

(57) ABSTRACT

An apparatus includes a network interface and a processing unit. The network interface transmits a security payload. The processing unit determines a first partition of a queuing service for the security payload at a first time, at least in part based on a determination that an initial attempt to transmit the security payload failed. The processing unit also instructs a retrieval of the security payload from the first partition to perform a first retry attempt to transmit the security payload, at least in part based on a determination that a first retry interval since the first time has elapsed.

20 Claims, 5 Drawing Sheets

Fig. 2
200

SYSTEMS AND METHODS FOR DELIVERY USING A MESSAGE QUEUE

CROSS-REFERENCE TO RELATED APPLICATION

This application claims the benefit of priority under 35 U.S.C. § 119(e) to Indian Provisional Application No. 202041049317, entitled "SYSTEMS AND METHODS FOR DELIVERY USING A MESSAGE QUEUE," inventors Venkatesen et al., filed in the Indian Patent Office on Nov. 11, 2020, which is hereby incorporated by reference in its entirety.

BACKGROUND

Technical Field

This disclosure relates to accessing, addressing, or allocating messages in a memory system and, in particular, to balancing a message queue for undelivered push notifications.

Related Art

Computer systems can deliver content to users by using a push model for notifications or a pull model for notifications. In the push model, a server delivers content to a client without a specific request from the client. That is, the server controls the trigger for the delivery.

In the pull model, the client first sends a polling query to the server. If the server determines that content should be sent to the client in response to the polling query, the sever controls the delivery of the content to the client. That is, the client controls the trigger for the delivery by virtue of sending the polling request.

Conventional cloud partner-to-partner security posture interchange uses the pull model. Pull models typically introduce delays and added expense during the queries, due to the determination whether there is content waiting for the receiving client. The delays and added expense can be particularly problematic when there are millions or billions of these queries being made every day, as is the case in the context of security payloads.

Meanwhile, push models suffer from issues around availability of the target service.

BRIEF SUMMARY

In one implementation of the present disclosure, an apparatus includes a network interface that transmits a security payload; and a processing unit configured to determine a first partition of a queuing service for the security payload at a first time, at least in part based on a determination that an initial attempt to transmit the security payload failed, and to instruct a retrieval of the security payload from the first partition to perform a first retry attempt to transmit the security payload, at least in part based on a determination that a first retry interval since the first time has elapsed.

BRIEF DESCRIPTION OF THE SEVERAL VIEWS OF THE DRAWINGS

FIG. 2 illustrates a table used by a delivery system, according to an implementation of the present disclosure.

DETAILED DESCRIPTION

For purposes of illustrating the present innovation, it might be useful to understand phenomena relevant to various implementations of the disclosure. The following foundational information can be viewed as a basis from which the present disclosure can be explained. Such information is offered for purposes of explanation only and, accordingly, should not be construed in any way to limit the scope of the present disclosure and its potential applications.

Conventionally, a security artifact is any information (e.g., a log or other document) that can be used to trace back a security vulnerability in a customer network. For example, a security artifact might list threat events (e.g., a malware detection) that occurred at an end-user device. In another example, a security artifact might list information of a logged-in user. As another example, a security artifact is a document that was sent in violation of a data loss prevention policy.

When security artifacts are transmitted over a network, they are sent in the form of a message payload. The present disclosure uses the phrase "security payload" to refer to those message payloads.

Figure 1:
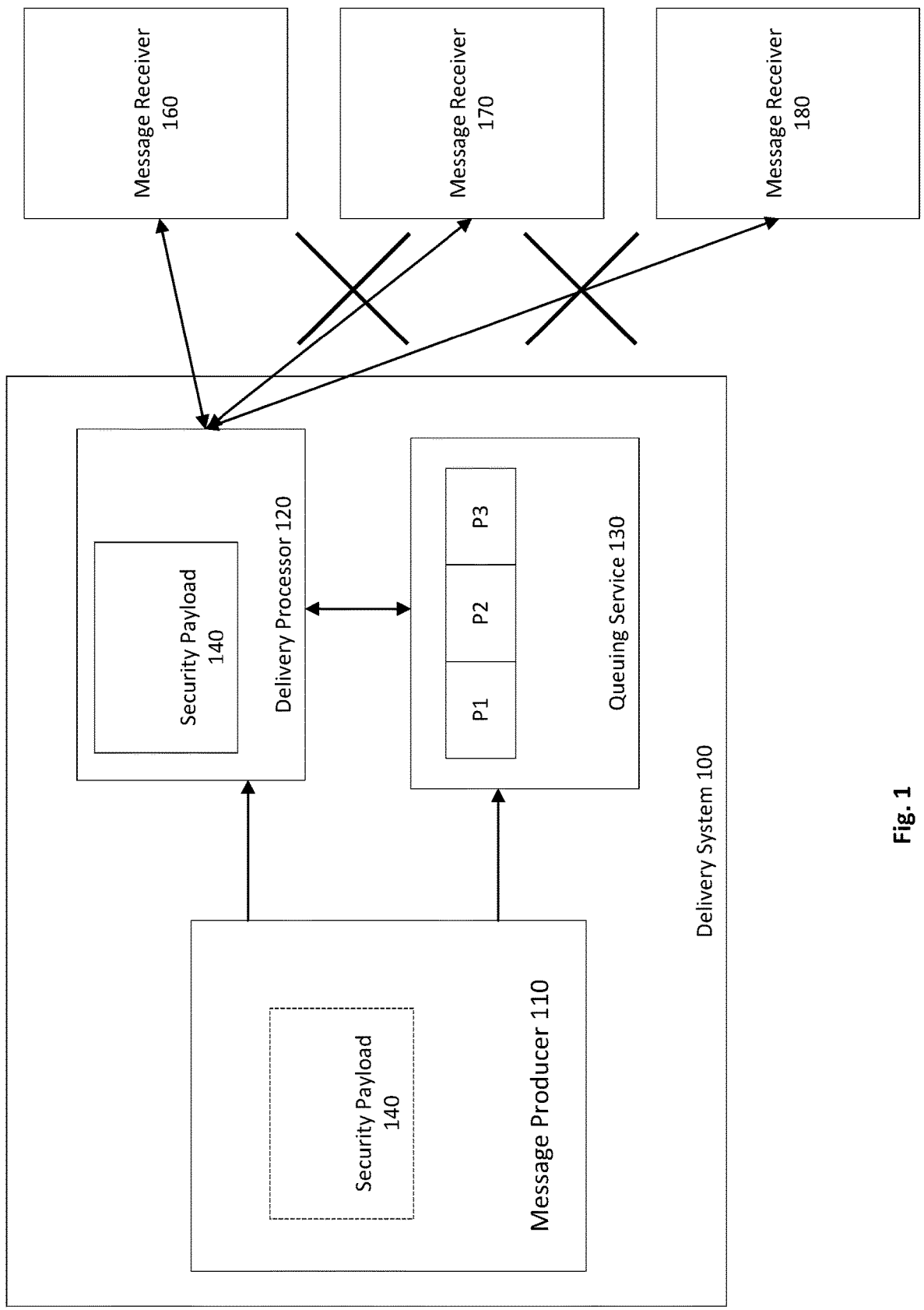
FIG. 1 illustrates a functional block diagram of a delivery pipeline, according to an implementation of the present disclosure.

FIG. 1 illustrates a functional block diagram of a delivery pipeline, according to an implementation of the present disclosure. The delivery pipeline includes delivery system 100 and message receivers 160, 170, 180. The delivery system 100 can include a message producer no, a delivery processor 120, and a queuing service 130. The message producer no includes a security payload 140. The queuing service 130 includes partitions P1, P2, and P3.

In various implementations, the delivery system 100 implements message queue partitioning to retry delivery of a security context if a receiving service (e.g., cloud partner, such as message receivers 160, 170, 180) is temporarily offline. As a result, some implementations of the delivery system 100 can ensure that push delivery of the security context to the receiving service is successful.

In various implementations, security artifacts are gathered by the message producer no to produce a security payload 140. The message producer no feeds the security payload 140 to the delivery processor 120.

The delivery processor 120 delivers security payloads to one or more designated endpoints as a service. In many implementations, an entity controlling the delivery processor 120 offers that service in a business relationship between the entity and another entity controlling one or more of the message receivers 160, 170, 180. Thus, the delivery processor 120 can look up the destination(s) (e.g., the designated endpoints) for the security payload 140, based on such a relationship. The delivery processor 120 attempts to connect to the one or more designated endpoints (e.g., REpresentational State Transfer (REST) endpoints). In the implementation illustrated in FIG. 1, the one or more designated endpoints are message receivers 160, 170, 180.

FIG. 1 illustrates that the message receivers 170 and 180 are offline. According to an example implementation, the message producer 110, on an initial delivery failure to the message receivers 170 and 180, generates security payloads destined for the queueing service 130. The message producer no can label the security payload 140, at least in part based on a timestamp and the identity of the offline message receivers (e.g., RN1-SP1-Timestamp1-MR170 and RN1-SP1-Timestamp2-MR18). The message producer 110 can insert the security payload into a partition P1, P2, P3 of the queueing service 130.

In various implementations, the queueing service 130 is partitioned based on a number of retries (e.g., RN1-RNx) for delivery of the security payload 140 to the offline message receivers 170, 180. According to an example implementation, security payloads that enter the queueing service 130 (i.e., have had at least one delivery failure) are queued independently per message receiver destination.

In various implementations, the message producer no can determine retry intervals for the queued security payloads as follows:

| Retry Number | Retry Interval |
|---|---|
| 1 | 20 seconds |
| 2 | 10 minutes |
| 3 | 90 minutes |
| 4 | 8 hours |

These retry intervals are exemplary and do not limit the scope of the present innovation.

Many message receivers are offline for a short period of time, and few message receivers are offline for long periods of time. An example of a message receiver 160, 170, 180 in the context of the present innovation is a data center. Such a data center might have estimated uptime of 99.9%, meaning the data center experiences downtime of 0.1% each year. That is, the data center expects to have cumulative downtime of 1.6 hours or less each year. Thus, in this context, a short time is a few seconds, and several minutes is a fairly long time.

In some implementations, queue partitions representing fewer retries advantageously store security payloads in high numbers for a short period of time. Further, queue partitions representing a greater number of retries store fewer security payloads for longer periods of time.

Thus, the queuing service 130 can distribute the security payloads across its memory, based on the retry number. In other words, the queuing service 130 partitions the security payloads by the number of retries, thus distributing the load to promote balance across the partitions of the queuing service 130.

By balancing the storage of the security payloads across the partitions based on retry numbers with increasing retry intervals, some implementations can balance the queue memory and disk footprint. Additional implementations can balance usage of the delivery processor 120.

In various implementations, the queuing service 130 can balance the partitions programmatically by altering the size of the retry intervals to achieve balance.

In various implementations, on a delivery success or failure, the queuing service 130 deletes the security payload. In further implementations, on a delivery failure, the delivery processor 120 increments the number of retries and records the current time. In two particular examples, the delivery processor 120 can store the number of retries and current time in a table (as later described) or in the name of the security payload 140.

Other examples are possible, such as storing the number of retries and the current time in the security payload 140 itself, such as in a header or footer. In select implementations, the header or footer can also include the identity of the message receiver. The header or footer also can include the number of retries and the time of a most recent failed delivery to the message receiver.

Then, the delivery processor 120 can insert the security payload 140 into the partition of the queuing service 130 corresponding to the next number of retries.

In various implementations, the delivery processor 120, when polling a query to the queuing service 130, determines whether the current time has exceeded a threshold for the next retry attempt. As an example, the delivery processor 120 can determine the threshold by adding the recorded time and the retry interval for the current number of retries. In some implementations, the recorded time is retrieved from a portion of the name of the security payload 140 or from a header or footer of the payload.

This determination can prevent reading records from the queueing service 130 that have not aged sufficiently for the given retry number. In other words, according to example implementations, the queue partitions in the queueing service 130 act as not-before, as opposed to between, times.

FIG. 2 illustrates a table 200 used by the delivery system, according to an implementation of the present disclosure.

In various implementations, the table 200 includes a retry number column 210, a message receiver column 220, a timestamp column 230, and a security payload identity column 240.

As discussed above, the queuing service 130 stores a security payload in a partition defined by a number of retries of sending the security payload. Thus, in many implementations, the queuing service 130 tracks the partition of the queuing service 130 storing the security payload by way of the number of retries.

The retry number column 210 includes a number of retries for sending a security payload to a particular message receiver. In some implementations, the table 200 can include a column for a partition of the queuing service 130 in addition or as an alternative to the number of retries. Similarly, in some implementations, the table 200 can include a column for a retry period in addition or as an alternative to the number of retries.

The message receiver column 220 includes the identity of the particular message receiver to which the delivery processor 120 will attempt a retry transmission of the security payload. In some implementations, the message receiver column can identify an Internet Protocol (IP) address, a name, a domain name, a customer ID, or other identifying information.

The timestamp column 230 includes a time at which the particular security payload was placed in the partition of the queuing service 130. In other implementations, the timestamp column 230 includes a time at which the delivery processor 120 performed the last attempt to transmit the security payload. In further implementations, the table 200 can include a column for a time at which the delivery processor 120 performs the next retry attempt for the particular security payload in addition or as an alternative to the timestamp column 230.

The security payload identity column 240 includes the identity of the particular security payload of which the transmission failed. In some implementations, the security payload identity column 240 can identify the security payload by a name or a checksum.

In the example of FIG. 2, the table 200 includes three entries. The top entry of the table 200 indicates a failure of an attempt to transmit security payload SP2 to message receiver MR2. The queuing service 130 placed security payload SP2 in a partition P1 corresponding to retry number RN1 at time 10:00:00.

The middle entry of the table 200 indicates a failure of an attempt to transmit security payload SP2 to message receiver MR3. The queuing service 130 placed security payload SP2 in a partition P1 corresponding to retry number RN1 at time 10:05:00.

In some implementations, two copies of security payload SP2 are placed in the partition P1 of the queuing service 130, which corresponds to retry number RN1. In other implementations, the partition P1 includes one copy of security payload SP2.

The bottom entry of the table 200 indicates a failure of an attempt to retry a transmission of security payload SP1 to message receiver MR2. The queuing service 130 placed security payload SP1 in a partition P2 corresponding to retry number RN2 at time 11:00:00.

In various implementations, based on the top entry in the table 200, the delivery processor 120 retries a transmission of the security payload SP2 to the message receiver MR2 at a time of 10:00:20 (e.g., based on the above retry interval for a first retry).

Based on the middle entry in the table 200, The delivery processor 120 retries a transmission of the security payload SP2 to the message receiver MR3 at a time of 10:05:20 (e.g., based on the retry interval for the first retry).

Based on the bottom entry in the table 200, the delivery processor 120 retries a transmission of the security payload SP1 to the message receiver MR2 at a time of 11:10:00 (e.g., based on the above retry interval for a second retry). As discussed above, the retry interval for the second retry is greater than the retry interval for the first retry.

As discussed previously, some implementations modify the name of the security payload, often as a substitute for using the table 200. Other implementations modify the security payload itself, such as a header or foot thereof. In these implementations, the queuing service 130 stores independent copies of the security payloads.

Figure 3:
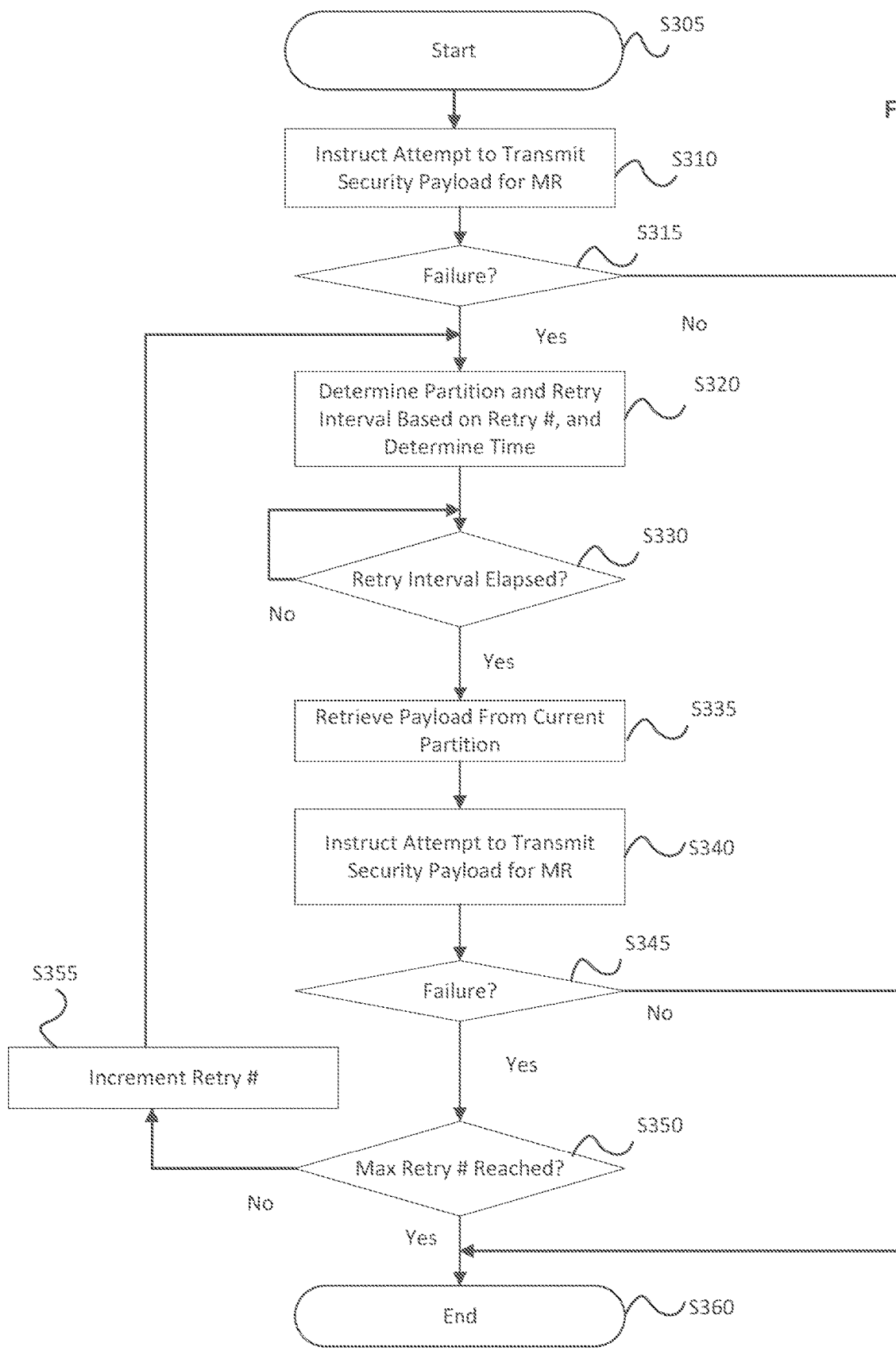
FIG. 3 illustrates an algorithm performed by a delivery system, according to an implementation of the present disclosure.

FIG. 3 illustrates an algorithm 300 performed by a delivery system according to an implementation of the present disclosure. The algorithm 300 begins at S305 and advances to S310.

At S310, a processor receives a security payload from the message producer no and instructs an attempt to transmit a security payload for a particular message receiver. A network interface (e.g., of delivery processor 120) receives the instruction and performs an initial attempt to transmit the security payload to the particular message receiver. The algorithm 300 then advances to S315.

In S315, the processor determines whether the initial attempt to transmit the security payload to the particular message receiver failed. For example, the processor can determine whether the network interface received an acknowledgement from the particular message receiver within a predetermined period of time (e.g., 10 seconds). If the network interface receives an acknowledgment from the particular message receiver within the predetermined period of time, then the processor determines the initial attempt to transmit the security payload was successful (e.g., did not fail). If the network interface does not receive an acknowledgment from the particular message receiver within the predetermined period of time, then the processor determines the initial attempt to transmit the security payload failed.

If the processor determines the initial attempt to transmit the security payload did not fail, then the algorithm 300 advances to S360. If the processor determines the initial attempt to transmit the security payload failed, then the algorithm 300 advances to S320 to prepare a first retry.

In S320, the processor determines a partition of the queuing service 130 in which to store the security payload, based on the retry number. For an initial retry (i.e., the retry after a failed initial transmission), the processor determines the security payload is to be stored in a first partition of the queuing service 130. The processor can instruct the queuing service 130 to store the security payload in the partition, and the queuing service 130 does so.

The processor also determines a time at which the security payload is stored in the queuing service 130. The processor records that time as a timestamp.

In addition, the processor determines a retry interval, based on the retry number. As discussed above, in many implementations, a lower retry number (e.g., one) has a shorter retry interval than a larger retry number (e.g., four). In various implementations, the retry intervals are static values. In other implementations, the processor dynamically determines one or more retry intervals to achieve a better balance of security payloads across the queuing service 130.

In some implementations, the processor stores the retry number, the identity of the message receiver, the timestamp, and the identify of the security payload in a table, such as table 200.

In various implementations, the processor renames an instance of the security payload, at least based on the determined time and the message recipient. The name can also include the retry number and the identity of the security payload. For example, the processor can rename the packet RN1-SP2-100000-MR2.

In at least one implementation, the processor can modify the header or footer of the security payload itself to identify the determined time and the message recipient.

The algorithm 300 then advances to S330.

In S330, the processor determines whether the retry interval determined in S320 has elapsed since the time determined in S320. For example, if the retry interval is 10 seconds and the determined time is 10:00:00, then the processor determines whether a current time is later than 10:00:10. For example, the processor can query the entries of the table 200.

If the processor determines in S330 the retry interval has not elapsed, then the algorithm 300 returns to S330 to wait for the retry interval to elapse.

If the processor determines in S330 the retry interval has elapsed, then the algorithm 300 advances to S335.

In S335, the processor instructs a retrieval of the security payload from a partition of the queuing service 130. For example, the processor can determine the identity of the security payload for which the next transmission retry attempt is due, based on the retry number and the time stored for the entry in the table 200. In addition, the processor can determine the partition of the queuing service 130 that stores the security payload, based on the retry number stored in the table 200. Further, the processor can determine the message receiver to which the delivery processor 120 will attempt the next transmission retry, based on the entry in the table 200.

In some implementations, the processor can identify an instance of the security payload, based on the retry number and a time stored in a name of the security payload. Then, the processor can determine the message receiver, based on the name of the instance of the security payload. The processor can also determine the partition of the queuing service 130 and/or the retry number, based on the name of the instance of the security payload.

The processor optionally deletes the security payload from its current partition in S335.

The algorithm 300 then advances to S340.

In S340, the processor instructs performance of an attempt to retry transmission of the security payload to the message receiver determined in S335. For example, the processor instructs the delivery processor 120 to perform the attempt. In other implementations, the processor instructs a network interface to perform the attempt. The algorithm 300 then advances to S345.

In S345, the processor determines whether the attempt to retry the transmission of the security payload to the message receiver failed. As before, in one example, the processor can determine whether the network interface received an acknowledgement from the message receiver within a predetermined period of time (e.g., 10 seconds). If the network interface receives an acknowledgement from the message receiver within the predetermined period of time, then the processor determines the retry attempt to transmit the security payload was successful (e.g., did not fail). If the network interface does not receive an acknowledgement from the message receiver within the predetermined period of time, then the processor determines the retry attempt to transmit the security payload failed.

If the processor determines the retry attempt to transmit the security payload did not fail, then the algorithm 300 advances to S360. If the processor determines the retry attempt to transmit the security payload failed, then the algorithm 300 advances to S350.

In S350, the processor determines whether a maximum number of retries has been reached. For example, the maximum number of retries can be determined in view of the unlikelihood that a retry interval is exceeded. For example, a retry interval of more than two hours is unlikely to be exceeded for a message receiver expected to have cumulative downtime of less than 1.6 hours each year.

The maximum number of retries can also be determined in view of potential circumstances surrounding a retry interval being exceeded. For example, if a retry attempt to a message receiver is unsuccessful after eight hours, then the message receiver might be being replaced. In such a situation, the message receiver itself might request (e.g., pull) the security payloads, when the message receiver is again stable. Thus, it might not make sense to queue messages for more than eight hours for such a message receiver.

The maximum number of retries further can be determined based on storage constraints of the partitions or on any other criterion or criteria.

If the processor determines in S350 that the maximum number of retries has been reached, the algorithm 300 advances to S360.

If the processor determines in S350 that the maximum number of retries has not been reached, then the delivery processor 120 can delete the security payload. In some implementations, the delivery processor notifies an administrator of the delivery system 100 that the security payload was undeliverable to the message receiver. The algorithm 300 then advances to S355.

In S355, the processor increments the retry number for the security payload. For example, the processor can increment the number of retries in the entry for the security payload in the table 200. In another implementation, the processor can rename the instance of the security payload, based on the incremented retry number. In suitable implementations, the processor can modify the header or footer of the security payload with the incremented retry number. The algorithm 300 then returns to S320.

In S360, the algorithm 300 concludes.

In the example shown in FIG. 3, the processor retrieves the security payload from the current partition in S335. In other implementations, the processor periodically polls the queuing service 130 with the current time. Thus, the queuing service 130 or the partition thereof can identify and retrieve a security payload from the partition, based on the current time and the retry interval associated with the partition. The queuing service 130 or partition then returns the security payload to the processor.

Further, when an offline message receiver 170, 180 returns online, the delivery processor 120 delivers the queued push notifications in the order in which their retry intervals from their storage time elapse. Consequently, the push notifications are potentially delivered out of order (i.e., not in the order in which their initial transmission was attempted) and not necessarily all at once. As above, the delivery processor 120 can select security payloads from the queuing service 130 and can attempt to send the security payloads by the queue polling schedule. Such an implementation of the delivery system 100 typically delivers one security payload to a particular message receiver at a time.

In some implementations, the queuing service 130 is maintained per message receiver. In an exemplary such implementation, upon the delivery system 100 receiving an acknowledgement of a receipt of a security payload from the message receiver 170, the delivery processor 120 can retrieve outstanding security payloads from the partitions of the queuing service 130 for the message receiver 170. For example, the queuing service 130 can determine these security payloads, based on the message receiver column 220 of entries of the table 200. In other implementations, the queuing service 130 can determine these security payloads, based on the message receiver identified in the names of the security payloads. The delivery processor 120 can also identify the security payloads by determining whether their header or footer identifies the message receiver. The delivery processor 120 then can prioritize attempts to transmit the outstanding security payloads to message receiver 170. That is, the delivery processor 120 can recognize a successful delivery of a security payload to a message receiver, query the queuing service 130 for security payloads intended for this message receiver, and deliver the security payloads to the message receiver.

Figure 4:
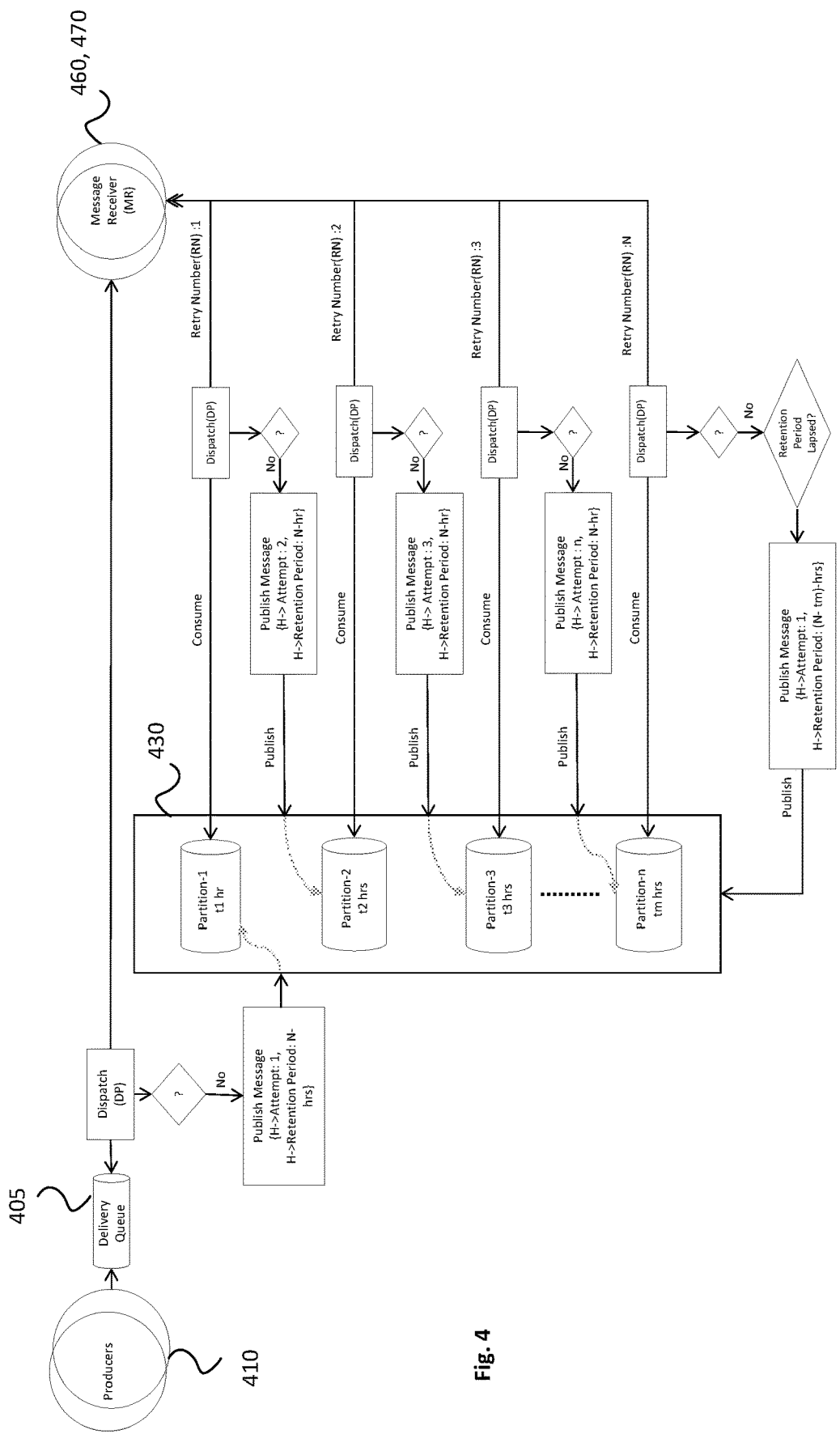
FIG. 4 illustrates a logical diagram of a delivery pipeline, according to another implementation of the present disclosure.

FIG. 4 illustrates a logical diagram of delivery pipeline 400, according to another implementation of the present disclosure. The delivery pipeline includes a delivery queue 405, message producers 410, a download queue 430, and message receivers 460, 470.

As illustrated in FIG. 4, the message producer 410 provides a security payload to the delivery queue 405. The delivery queue 405 attempts to dispatch the security payload to the message receivers 460, 470.

If the dispatch is unsuccessful, then the number of retry attempts to publish the security payload is set at 1, and a retry interval of t1 for the security payload is established. The security payload is then stored in a first partition of the download queue 430.

After a first retry interval (e.g., t1 hours) has elapsed since storage of the security payload in the first partition, the overall retention period of the security payload is decreased by the first retry interval. The security payload is consumed, and a dispatch is again attempted. In particular, a first retry transmission of the security payload to message receivers 460, 470 is attempted.

If the first retry transmission is unsuccessful, then the number of retry attempts to publish the security payload is set at 2, and a retry interval of t2 is established. The retry interval t2 generally differs from, and typically is longer than, the retry interval t1.

After a second retry interval (e.g., t2 hours) has elapsed since storage of the security payload in the second partition, the overall retention period of the security payload is decreased by the second retry interval, the security payload is again consumed, and a dispatch is again attempted.

In the example of FIG. 4, this process repeats until the nth retry transmission. If the nth retry transmission is unsuccessful, then the delivery system determines whether an overall retention period has elapsed. If the overall retention period has not elapsed, then the overall retention period is decreased by the retry interval of the nth retry, and the security payload is again stored in the first partition (with its retry interval of t1).

Advantageously, some implementations of the delivery system 100 do not require additional permanent storage. In various implementations, the delivery system 100 can keep the queue partitions balanced.

The delivery system 100 illustrated in FIG. 1 included the message producer no. In many implementations, the message producer 110 is outside the delivery system 100.

In the present disclosure, the queued messages were described in the context of security payloads. In other implementations, the queued messages are not security payloads and can include any other type of data.

In some implementations, the system can be modified to use the queuing service 130 for an initial attempt to send a security payload. In this sense, the queuing service 130 and the table 200 can accommodate initial tries (e.g., a retry number of 0).

Some implementations of the present disclosure use the Apache Kafka® platform. In particular, the queuing service 130 can be a Kafka® queue. Select implementations use IBM MQ products. In various implementations, messages are delivered through an API (application programming interface) program.

In many implementations, partitions within the queuing service 130 act as distinct logical queues that are backed by a given partition within the queuing service 130.

In the above description, the queuing service 130 can contain multiple partitions, and the partitions can be further divided. In several implementations, the partitions of queuing service 130 can be generic for a plurality of message receivers; in other implementations, one or more message receivers have independent partitions of the queuing service 130.

In many implementations, the message producer no publishes security artifacts to a delivery queue for an initial delivery attempt of a security payload. In various implementations, the queuing service 130 is generic in the sense that it does not contain differentiated partitions. Further, although the delivery processor 120 attempts to transmit a security payload to multiple message receivers, the delivery queue typically contains only one copy of the security payload.

When an attempt to deliver a security payload fails, the delivery processor 120 inserts or publishes the security payload to the queuing service 130. In various implementations, the delivery processor 120 pushes an independent copy of the security payload into the queuing service 130 for a failed message receiver. That is, if the delivery processor 120 fails to deliver the security payload to message receivers 170, 180, then the queuing service 130 can contain two copies of the security payload, according to many implementations.

In some implementations, there is one generic queuing service 130 for a plurality of message receivers that is partitioned per retry number value. In some implementations, the queuing service 130 further divides the partitions to have one download queue per message receiver.

The system may include one or more processors and memory that, when executed by the one or more processors, cause the system to perform the implementations described herein.

Figure 5:
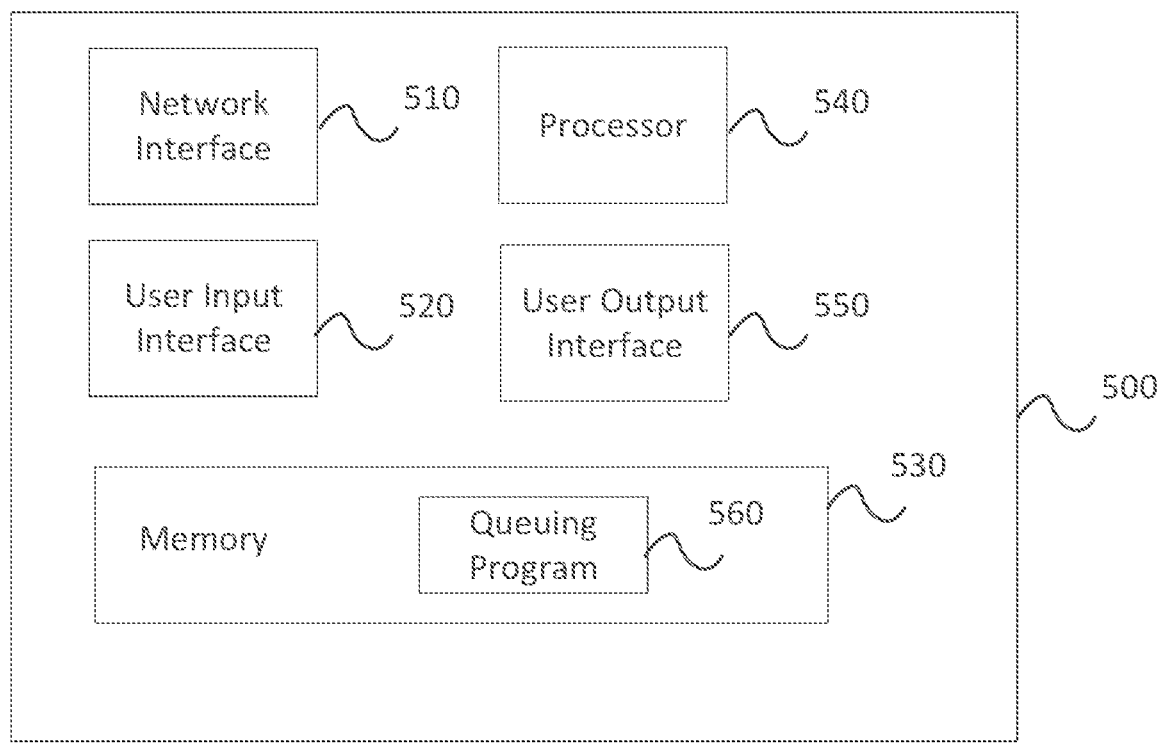
FIG. 5 illustrates a computer system according to an implementation of the present disclosure.

FIG. 5 illustrates a computing device 500, according to an implementation of the present disclosure.

Although illustrated within a single housing, the computing device 500 can be distributed across plural housings or sub-systems that cooperate in executing program instructions. In some implementations, the computing device 500 can include one or more blade server devices, standalone server devices, personal computers (including laptop computers and tablet computers), routers, hubs, switches, bridges, firewall devices, intrusion detection devices, mainframe computers, network-attached storage devices, video game systems, smartphones and other mobile telephones, and other computing devices. The computing device 500 can execute the Windows® operating system in many implementations. The hardware of the computing device 500 can be configured according to a Symmetric Multi-Processing (SMP) architecture or a Non-Uniform Memory Access (NUMA) architecture.

The computing device 500 can include a network interface 510 that provides one or more communication connections and/or one or more devices that allow for communication between the computing device 500 and other computing systems (not shown) over a communication network or collection of networks (not shown) or the air. The network interface can communicate using near-field communications (NFC), Wi-Fi™, Bluetooth, Ethernet, cellular (e.g., 4G, 5G), facsimile, or any other wired or wireless interface.

The computing device 500 can also include a user input interface 520 that receives inputs from a human. The user input interface 520 can be or include a mouse, a touchpad, a keyboard, a touchscreen, a trackball, a camera, a microphone, a joystick, a game controller, a scanner, or any other input device.

The computing device 500 can include a memory 530, also termed a "storage." The memory 530 can include or be one or more computer-readable storage media readable by a processor 540 and that store software. The memory 530 can be implemented as one storage device and can also be implemented across multiple co-located or distributed storage devices or sub-systems. The memory 530 can include additional elements, such as a memory controller, that communicate with the processor 540. The memory 530 can also include storage devices and/or sub-systems on which data and/or instructions are stored. The computing device 500 can access one or more storage resources to access information to carry out any of the processes indicated in this disclosure and, in particular, FIG. 3.

The memory 530 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a hard drive, a cache memory, a flash memory, a removable disk, or a tape reel. The memory 530 can be or include resistive RAM (RRAM) or a magnetoresistive RAM (MRAM). Other implementations are possible.

A message queuing program 560 stored in memory 530 can include routines for at least partially performing at least one of the processes illustrated in FIG. 3 and can be implemented in program instructions. Further, the software, when executed by the computing device 500 in general or the processor 540 specifically, can direct, among other functions, the computing device 500 or the processor 540 to perform the message queuing as described herein.

The computing device 500 can include a processor 540 (e.g., a processing unit). The processor 540 can perform the operations of the message producer 110, the delivery processor 120, and/or the queuing service 130. The processor 540 can be or include one or more hardware processors and/or other circuitry that retrieve and execute software from the memory 530. The processor 540 can be implemented within one processing device, chip, or package and can also be distributed across multiple processing devices, chips, packages, or sub-systems that cooperate in executing program instructions. In some implementations, the processor 540 is or includes a Graphics Processing Unit (GPU).

The processor 540 can have any register size, such as a 32-bit register or a 64-bit register, among others. The processor 540 can include multiple cores. Implementations of the processor 540 are not limited to any particular number of threads. The processor 540 can be fabricated by any process technology, such as 14 nm process technology.

The computing device 500 can also include a user output interface 550 that outputs information to a human user. The user output interface 550 can be or include a display (e.g., a screen), a touchscreen, speakers, a printer, or a haptic feedback unit. In many implementations, the user output interface 550 can be combined with the user input interface 520 to include, for example, a touchscreen or a headset including headphones and a microphone.

In implementations including multiple computing devices, a server of the system or, in a serverless implementation, a peer can use one or more communications networks that facilitate communication among the computing devices. For example, the one or more communications networks can include or be a local area network (LAN), a wide area network (WAN), or a metropolitan area network (MAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, and cache memory, and to transitory storage media, such as carrier waves or propagating signals.

Aspects of the system for message queuing can be implemented in various manners (e.g., as a method, a system, a computer program product, or one or more computer-readable storage media). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various implementations, different operations and portions of the operations of the algorithms described can be performed by different processing units. Furthermore, aspects of the present disclosure can take the form of a computer program product implemented in one or more computer-readable media having computer-readable program code implemented, e.g., encoded or stored, thereon. In various implementations, such a computer program can, for example, be downloaded (or updated) to existing devices and systems or be stored upon manufacture of these devices and systems.

The detailed description presents various descriptions of specific implementations. The innovations described can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, particular implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve the developer's specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, and supporting chipsets) and computer-readable memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the drawings can be implemented as stand-alone modules (e.g., a device with associated components and circuitry configured to perform a specific application or function) or implemented as plug-in modules into application-specific hardware of electronic devices.

Implementations of the present disclosure can be readily included in a system-on-chip (SOC) package. An SOC represents an integrated circuit (IC) that integrates components of a computer or other electronic system into one chip. The SOC can contain digital, analog, mixed-signal, and radio frequency functions on one chip substrate. Other implementations can include a multi-chip-module (MCM) with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), a programmable logic array (PLA), programmable array logic (PAL), generic array logic (GAL), and other semiconductor chips.

The specifications, dimensions, and relationships outlined herein (e.g., the number of processors and logic operations) have been offered for non-limiting purposes of example and teaching. Such information can be varied considerably. For example, various modifications and changes can be made to arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in any manner. Along similar design alternatives, the illustrated components, modules, and elements of the drawings can be combined in various possible configurations within the scope of this disclosure. In some cases, it is clearer to describe one or more of the functionalities of a given set of flows by referencing a reduced number of electrical elements. The electrical circuits of the drawings and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation," "example implementation," "an implementation," "another implementation," "some implementations," "various implementations," "other implementations," "alternative implementation," and the like are intended to mean that any such features are included in one or more implementations of the present disclosure and might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example A1, an apparatus includes a network interface that performs an initial attempt to transmit a security payload; and a processing unit configured to determine a first partition of a queuing service for storing the security payload at a first time, at least in part based on a determination that an initial attempt to transmit the security payload failed, and to instruct a retrieval of the security payload from the first partition to perform a first retry attempt to transmit the security payload, at least in part based on a determination that a first retry interval since the first time has elapsed.

Example A2 is the apparatus of Example A1, wherein the processing unit further is configured to determine a second partition of the queuing service for storing the security payload at a second time, at least in part based on a determination that the first retry attempt to transmit the security payload failed.

Example A3 is the apparatus of Example A2, wherein the determination that the first retry attempt to transmit the security payload failed is at least in part based on a determination that the network interface did not receive an acknowledgement of the first retry attempt within a second predetermined time.

Example A4 is the apparatus of any of Examples A2-A3, wherein the processing unit further is configured to determine a second retry interval, the second retry interval being different than the first retry interval, and to instruct a retrieval of the security payload from the second partition to perform a second retry attempt to transmit the security payload, at least in part based on a determination that the second retry interval since the second time has elapsed.

Example A5 is the apparatus of Example A4, wherein the second retry interval is greater than the first retry interval.

Example A6 is the apparatus of any of Examples A1-A5, wherein the processing unit further is configured to name the security payload, at least in part based on the first time and a recipient of the security payload.

Example A7 is the apparatus of any of Examples A1-A6, wherein the processing unit further is configured to instruct the network interface to perform the first retry attempt to transmit the security payload.

In Example C1, a non-transitory, computer-readable medium is encoded with instructions that, when executed by a computer, cause the computer to perform operations comprising: performing an initial attempt to transmit a security payload; determining a first partition of a queuing service for storing the security payload at a first time, at least in part based on a determination that an initial attempt to transmit the security payload failed; and instructing a retrieval of the security payload from the first partition to perform a first retry attempt to transmit the security payload, at least in part based on a determination that a first retry interval since the first time has elapsed.

Example C2 is the medium of Example C1, the operations further comprising: determining a second partition of the queuing service for storing the security payload at a second time, at least in part based on a determination that the first retry attempt to transmit the security payload failed.

Example C3 is the medium of Example C2, wherein the determination that the first retry attempt to transmit the security payload failed is at least in part based on a determination that an acknowledgement of the first retry attempt was not received within a second predetermined time.

Example C4 is the medium of any of Examples C2-C3, the operations further comprising: determining a second retry interval, the second retry interval being different than the first retry interval; and instructing a retrieval of the security payload from the second partition to perform a second retry attempt to transmit the security payload, at least in part based on a determination that the second retry interval since the second time has elapsed.

Example C5 is the medium of Example C4, wherein the second retry interval is greater than the first retry interval.

Example C6 is the medium of any of Examples C1-C5, the operations further comprising: naming the security payload, at least in part based on the first time and a recipient of the security payload.

Example C7 is the medium of any of Examples C1-C6, the operations further comprising: instructing a performance of the first retry attempt to transmit the security payload.

In Example M1, a method includes: performing an initial attempt to transmit a security payload; determining a first partition of a queuing service for storing the security payload at a first time, at least in part based on a determination that the initial attempt to transmit the security payload failed; and instructing a retrieval of the security payload from the first partition to perform a first retry attempt to transmit the security payload, at least in part based on a determination that a first retry interval since the first time has elapsed.

Example M2 is the method of Example M1, further comprising: determining a second partition of the queuing service for storing the security payload at a second time, at least in part based on a determination that the first retry attempt to transmit the security payload failed.

Example M3 is the method of Example M2, wherein the determination that the first retry attempt to transmit the security payload failed is at least in part based on a determination that an acknowledgement of the first retry attempt was not received within a second predetermined time.

Example M4 is the method of any of Examples M2-M3, further comprising: determining a second retry interval, the second retry interval being different than the first retry interval; and instructing a retrieval of the security payload from the second partition to perform a second retry attempt to transmit the security payload, at least in part based on a determination that the second retry interval since the second time has elapsed.

Example M5 is the method of Example M4, further comprising: naming the security payload at least in part based on the first time and a recipient of the security payload.

Example M6 is the method of any of Examples M1-M5, wherein the second retry interval is greater than the first retry interval.

Example M7 is the method of any of Examples M1-M6, further comprising: instructing a transmission of the first retry attempt of the security payload.

We claim:

1. An apparatus, comprising:
a network interface that performs an initial attempt to transmit a security payload; and
a processing unit configured
to determine a first partition of a queuing service for storing the security payload at a first time, at least in part based on a determination that the initial attempt to transmit the security payload failed,
to instruct a retrieval of the security payload from the first partition to perform a first retry attempt to transmit the security payload, at least in part based on a determination that a first retry interval since the first time has elapsed,
to determine a second partition of the queuing service for storing the security payload at a second time, at least in part based on a determination that the first retry attempt to transmit the security payload failed,
to determine a second retry interval, the second retry interval being different than the first retry interval, and
to instruct a retrieval of the security payload from the second Partition to perform a second retry attempt to transmit the security Payload, at least in part based on a determination that the second retry interval since the second time has elapsed.

2. The apparatus of claim 1, wherein the determination that the first retry attempt to transmit the security payload failed is at least in part based on a determination that the network interface did not receive an acknowledgement of the first retry attempt within a second predetermined time.

3. The apparatus of claim 1, wherein the second retry interval is greater than the first retry interval.

4. The apparatus of claim 1, wherein the processing unit further is configured to name the security payload, at least in part based on the first time and a recipient of the security payload.

5. The apparatus of claim 1, wherein the processing unit further is configured to instruct the network interface to perform the first retry attempt to transmit the security payload.

6. The apparatus of claim 1, wherein the processing unit further is configured to alter a size of the first retry interval or the second retry interval to balance the first partition and the second partition.

7. The apparatus of claim 1, wherein the processing unit further is configured to query the queuing service for a second security payload for a message receiver, if an acknowledgement of the security payload is received from the message receiver.

8. A non-transitory, computer-readable medium comprising instructions that, when executed by a computer, cause the computer to:
perform an initial attempt to transmit a security payload;
determine a first partition of a queuing service for storing the security payload at a first time, at least in part based on a determination that the initial attempt to transmit the security payload failed;
instruct a retrieval of the security payload from the first partition to perform a first retry attempt to transmit the security payload, at least in part based on a determination that a first retry interval since the first time has elapsed;
determine a second partition of the queuing service for storing the security payload at a second time, at least in part based on a determination that the first retry attempt to transmit the security payload failed;
determine a second retry interval, the second retry interval being different than the first retry interval; and
instruct a retrieval of the security payload from the second partition to perform a second retry attempt to transmit the security payload, at least in part based on a determination that the second retry interval since the second time has elapsed.

9. The medium of claim 8, wherein the determination that the first retry attempt to transmit the security payload failed is at least in part based on a determination that an acknowledgement of the first retry attempt was not received within a second predetermined time.

10. The medium of claim 8, wherein the second retry interval is greater than the first retry interval.

11. The medium of claim 8, wherein the instructions further cause the computer to name the security payload, at least in part based on the first time and a recipient of the security payload.

12. The medium of claim 8, wherein the instructions further cause the computer to instruct a performance of the first retry attempt to transmit the security payload.

13. The medium of claim 8, wherein the instructions further cause the computer to alter a size of the first retry interval or the second retry interval to balance the first partition and the second partition.

14. The medium of claim 8, wherein the instructions further cause the computer to query the queuing service for a second security payload for a message receiver, if an acknowledgement of the security payload is received from the message receiver.

15. A method, comprising:
performing an initial attempt to transmit a security payload;
determining a first partition of a queuing service for storing the security payload at a first time, at least in part based on a determination that the initial attempt to transmit the security payload failed;
instructing a retrieval of the security payload from the first partition to perform a first retry attempt to transmit the security payload, at least in part based on a determination that a first retry interval since the first time has elapsed;
determining a second partition of the queuing service for storing the security payload at a second time, at least in part based on a determination that the first retry attempt to transmit the security payload failed;
determining a second retry interval, the second retry interval being different than the first retry interval; and
instructing a retrieval of the security payload from the second partition to perform a second retry attempt to transmit the security payload, at least in part based on a determination that the second retry interval since the second time has elapsed.

16. The method of claim 15, wherein the determination that the first retry attempt to transmit the security payload failed is at least in part based on a determination that an acknowledgement of the first retry attempt was not received within a second predetermined time.

17. The method of claim 15, wherein the second retry interval is greater than the first retry interval.

18. The method of claim 15, further comprising:
instructing a performance of the first retry attempt to transmit the security payload.

19. The method of claim 15, further comprising:
altering a size of the first retry interval or the second retry interval to balance the first partition and the second partition.

20. The method of claim 15, further comprising:
querying the queuing service for a second security payload for a message receiver, if an acknowledgement of the security payload is received from the message receiver.

* * * * *